United States Patent
Li et al.

(10) Patent No.: US 10,620,477 B2
(45) Date of Patent: Apr. 14, 2020

(54) DISPLAY ASSEMBLY, MANUFACTURING METHOD THEREOF, AND DISPLAY DEVICE

(71) Applicant: BOE TECHNOLOGY GROUP CO., LTD., Beijing (CN)

(72) Inventors: Xin Li, Beijing (CN); Guangkui Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/744,988

(22) PCT Filed: Aug. 1, 2017

(86) PCT No.: PCT/CN2017/095412
§ 371 (c)(1),
(2) Date: Jan. 15, 2018

(87) PCT Pub. No.: WO2018/028468
PCT Pub. Date: Feb. 15, 2018

(65) Prior Publication Data
US 2019/0155104 A1 May 23, 2019

(30) Foreign Application Priority Data
Aug. 11, 2016 (CN) .......................... 2016 1 0657571

(51) Int. Cl.
G02F 1/1335 (2006.01)
G02F 1/1334 (2006.01)
G02F 1/1333 (2006.01)

(52) U.S. Cl.
CPC ...... *G02F 1/133615* (2013.01); *G02F 1/1334* (2013.01); *G02F 1/13362* (2013.01);
(Continued)

(58) Field of Classification Search
None
See application file for complete search history.

(56) References Cited

U.S. PATENT DOCUMENTS 5,686,017 A * 11/1997 Kobayashi ........... C09K 19/544
252/299.01
6,847,428 B1    1/2005 Sekiguchi
(Continued)

FOREIGN PATENT DOCUMENTS

| CN | 103293744 A | 9/2013 |
| CN | 106019675 A | 10/2016 |
| JP | 2005275184 A * | 10/2005 ............... F21V 8/00 |

OTHER PUBLICATIONS

International Search Report and Written Opinion in PCT/CN2017/095412 dated Oct. 26, 2017.
(Continued)

*Primary Examiner* — Edward J Glick
*Assistant Examiner* — Anthony G Quash
(74) *Attorney, Agent, or Firm* — Syncoda LLC; Feng Ma

(57) ABSTRACT

A display assembly having opposingly disposed display surface and back surface is disclosed herein, which includes a pixel electrode substrate and a common electrode substrate. A liquid crystal layer is sandwiched between, and configured to be in a scattering state if an electric field is applied to, the pixel electrode substrate and the common electrode substrate. A light source at a lateral side of the display assembly generates, and emits into the display assembly, a linearly polarized light having a first polarization direction. A blocking member disposed at the side of the back surface is configured to block a light having the first polarization direction to, and to allow a light having a second polarization direction perpendicular to the first polarization direction to pass therethrough. A method for manufacturing the display assembly, and a display device including one or two display assemblies are also disclosed.

14 Claims, 8 Drawing Sheets

(52) U.S. Cl.
CPC .......... *G02F 1/133365* (2013.01); *G02F 2001/13347* (2013.01); *G02F 2001/133342* (2013.01); *G02F 2001/133548* (2013.01)

(56) References Cited

U.S. PATENT DOCUMENTS

| | | | |
|---|---|---|---|
| 2008/0100779 A1* | 5/2008 | Choo ................ | B29D 11/0074 349/96 |
| 2010/0134719 A1* | 6/2010 | Johns .................. | C23C 14/02 349/62 |
| 2011/0169877 A1* | 7/2011 | Ishida ................. | G02F 1/1334 345/690 |
| 2016/0011355 A1* | 1/2016 | Kokudo ............... | G02B 6/0023 349/62 |
| 2016/0091752 A1 | 3/2016 | Lien | |
| 2016/0163271 A1* | 6/2016 | Sakaigawa ........... | G02F 1/1326 345/694 |
| 2016/0252788 A1* | 9/2016 | Takeda ............... | G02F 1/136209 349/43 |

OTHER PUBLICATIONS

Extended European Search Report in EP17838598.5 dated Jan. 16, 2019.

* cited by examiner

DISPLAY ASSEMBLY, MANUFACTURING METHOD THEREOF, AND DISPLAY DEVICE

CROSS-REFERENCE TO RELATED APPLICATION

The present application claims priority to Chinese Patent Application No. 201610657571.1 filed on Aug. 11, 2016, the disclosure of which is hereby incorporated by reference in its entirety.

TECHNICAL FIELD

The present disclosure relates generally to a field of display technologies, and more specifically to a display assembly, its manufacturing method, and a display device.

BACKGROUND

In existing display technologies, a double-sided display is conventionally realized by back-to-back bonding of two display devices. As for a double-sided display device that is transparent, because of its transparent characteristics, the images displayed by the two sides of the double-sided transparent display device generally interfere with each other. As a result, the display effect of such a display device is very poor, and at present time, there are no transparent display devices that can achieve double-sided display.

SUMMARY

One purpose of the present disclosure is to address the above mentioned issues associated with current double-sided display technologies.

In a first aspect, the present disclosure provides a display assembly, which has a display surface and a back surface, disposed to be opposing to each other. The display assembly includes a pixel electrode substrate and a common electrode substrate, which are oppositely aligned to be closer to the display surface and to the back surface, respectively.

The display assembly also includes a liquid crystal layer, which is sandwiched between, and configured to be in a scattering state if an electric field is applied to, the pixel electrode substrate and the common electrode substrate.

The display assembly further includes a light source disposed at a lateral side of the display assembly, which is configured to generate, and emit into the display assembly, a linearly polarized light having a first polarization direction.

The display assembly further includes a blocking member disposed at the side of the back surface, which is configured to block a light having the first polarization direction to, and to allow a light having a second polarization direction perpendicular to the first polarization direction to pass therethrough.

According to some embodiments of the display assembly, the blocking member can comprise a metal wire grid polarizer having a direction of transmission axis perpendicular to the first polarization direction. Herein the metal wire grid polarizer can be integrated in the common electrode substrate, the metal wire grid polarizer can comprise at least one of Al, Fe, or Cr.

In the display assembly, the liquid crystal layer can comprise molecules of a macromolecule polymer and particles of a liquid crystal dispersed in the molecules of the macromolecule polymer. The molecules of the macromolecule polymer and the particles of the liquid crystal are configured to have different refractive indices in a presence of, and to have a substantially same refractive index in an absence of, the electric field.

According to some embodiments of the disclosure, the display assembly can be configured to have an altered scattering power according to a distance to the light source to thereby realize substantially uniform display therefor.

In the above mentioned embodiments of the display assembly, as for any two regions of a same size and of a different distance to the light source, a first portion of the display assembly corresponding to a first region that is closer to the light source can be configured to have a weaker scattering power than a second portion of the display assembly corresponding to a second region that is farther from the light source under a substantially same electrical signal, such that the first region and the second region have a substantially same intensity of light scattered out of the display surface.

As such, the liquid crystal layer can comprise molecules of a macromolecule polymer and particles of a liquid crystal dispersed in the molecules of the macromolecule polymer, and a first pixel electrode in the first region can be configured to have a smaller area than a second pixel electrode in the second region.

In addition, the liquid crystal layer can comprise molecules of a macromolecule polymer and particles of a liquid crystal dispersed in the molecules of the macromolecule polymer, and the first portion of the display assembly can comprise a lower concentration of the molecules of the macromolecule polymer than the second portion of the display assembly.

In any of the above mentioned embodiments of the display assembly, the display assembly can further include a reflector. The reflector is disposed on a side of the display assembly opposing to the light source, and is configured to reflect light emitted from the light source and transmitting in the liquid crystal layer back into the liquid crystal layer to thereby improve a utilization rate of the light.

In a second aspect, a display device is further disclosed herein.

According to some embodiments of the disclosure, the display device includes one display assembly according to any one of the embodiments as described above. The display device can further include a transparent substrate, which is disposed over the back surface and opposing to the display surface of the one display assembly.

According to some other embodiments of the disclosure, the display device can further include another display assembly according to any one of the embodiments as described above. In the display device, the one display assembly and the another display assembly can be oppositely aligned to have the display surface thereof respectively facing outward.

Herein the blocking member of the one display assembly and the blocking member of the another display assembly can be integrated into a shared blocking member.

In the display device as mentioned above, the common electrode substrate of the one display assembly and the common electrode substrate of the another display assembly can be integrated into a shared common electrode substrate.

As such, the shared blocking member can be integrated into the shared common electrode substrate, and the shared blocking member can comprise a metal wire grid polarizer, which comprises at least one Al, Fe, or Cr, and has a direction of the transmission axis perpendicular to the first polarization direction.

In one specific embodiment of the display device, the metal wire grid polarizer comprises Cr and has a thickness of around 25 nm.

According to some embodiments of the display device, the one display assembly and the another display assembly can be configured to have an effective display area thereof respectively separated from one another.

As such, the common electrode substrate of the one display assembly and the common electrode substrate of the another display assembly are integrated into a shared common electrode substrate; and orthographic projection of each first pixel electrode in the pixel electrode substrate of the one display assembly over the shared common electrode substrate is not overlapped with orthographic projection of each second pixel electrode in the pixel electrode substrate of the another display assembly over the shared common electrode substrate.

In a third aspect, the disclosure further provides a method for manufacturing a display assembly. The method includes the following two steps:

providing a pixel electrode substrate and a common electrode substrate such that the pixel electrode substrate and the common electrode substrate are oppositely aligned; and forming a liquid crystal layer between the pixel electrode substrate and the common electrode substrate such that liquid crystal layer is configured to have an altered scattering power according to a distance to one side of the display assembly configured to receive light emitted from a light source to thereby realize substantially uniform display for the display assembly.

In the step of forming a liquid crystal layer between the pixel electrode substrate and the common electrode substrate, the liquid crystal layer can comprise molecules of a macromolecule polymer and particles of a liquid crystal dispersed in the molecules of the macromolecule polymer, and for any two regions of a same size and of a different distance to the one side, a first portion of the liquid crystal layer corresponding to a first region that is closer to the one side can be configured to comprise a lower concentration of the molecules of the macromolecule polymer than a second portion of the liquid crystal layer corresponding to a second region that is farther from the one side.

According to some embodiments of the disclosure, between the step of providing a pixel electrode substrate and a common electrode substrate and the step of forming a liquid crystal layer between the pixel electrode substrate and the common electrode substrate, the method can further comprise a step of forming a plurality of chambers between the pixel electrode substrate and the common electrode substrate, wherein each chamber has a same size and a different distance to the one side. Accordingly, the step of forming a liquid crystal layer between the pixel electrode substrate and the common electrode substrate can comprise the following sub-steps:

injecting a mixture of liquid crystals and monomer molecules of a different concentration in each of the plurality of chambers such that for any two chambers, a first chamber closer to the one side contains a higher concentration of the monomer molecules than a second chamber farther from the one side; and performing a polymerization process to the mixture in each of the plurality of chambers under a substantially same reaction condition.

According to some embodiments of the method, the step of forming a liquid crystal layer between the pixel electrode substrate and the common electrode substrate comprises the following sub-steps:

injecting a mixture of liquid crystals and monomer molecules between the pixel electrode substrate and the common electrode substrate; and performing a polymerization process to the mixture under altered reaction conditions to thereby form the molecules of the macromolecule polymer.

In the above-mentioned embodiments of the method, the sub-step of performing a polymerization process to the mixture under altered reaction conditions comprises:

exposing the mixture in an ultra-violet light, wherein the altered reaction conditions are realized by controlling at least one reaction parameter according to a distance to the one side.

Herein the at least one reaction parameter comprises at least one of polymerization temperature, exposure time, and exposure intensity.

According to some embodiments, the at least one reaction parameter includes polymerization temperature, configured such that a polymerization temperature for the first region is configured to be lower than a polymerization temperature for the second region.

According to some embodiments, the at least one reaction parameter includes exposure time, configured such that an exposure time for the first region is configured to be shorter than an exposure time for the second region.

According to some embodiments, theat least one reaction parameter comprises exposure intensity, configured such that an exposure intensity for the first region is configured to be weaker than an exposure intensity for the second region.

BRIEF DESCRIPTION OF DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of the embodiments disclosed herein, the technical solutions of the embodiments of the invention will be described in a clear and fully understandable way. It is noted that the described embodiments are merely a portion but not all of the embodiments of the invention. Based on the described embodiments of the invention, those ordinarily skilled in the art can obtain other embodiment(s), which come(s) within the scope sought for protection by the invention.

In the double-sided display device and electronic device provided by the present disclosure, a blocking member is arranged between the optical waveguide display assemblies which can achieve transparent display.

On the one hand, when each optical waveguide display assembly is in a display state, the blocking member is configured to block a linearly polarized light that reaches a surface of the blocking member after being scattered by a liquid crystal layer disposed in the each optical waveguide display assembly. The interference between the optical waveguide display assemblies in such a double-sided display device can thereby be avoided.

On the other hand, as for an environmental light (for example a natural light), a first portion of the environmental light that has one polarization direction is blocked by the blocking member, yet a second portion of the environmental light that has another polarization direction perpendicular to the one polarization direction can pass through the blocking member to become a background light for the display device, thereby realizing a transparent display for the display device.

In a first aspect, the present disclosure provides a double-sided display device.

Figure 1:
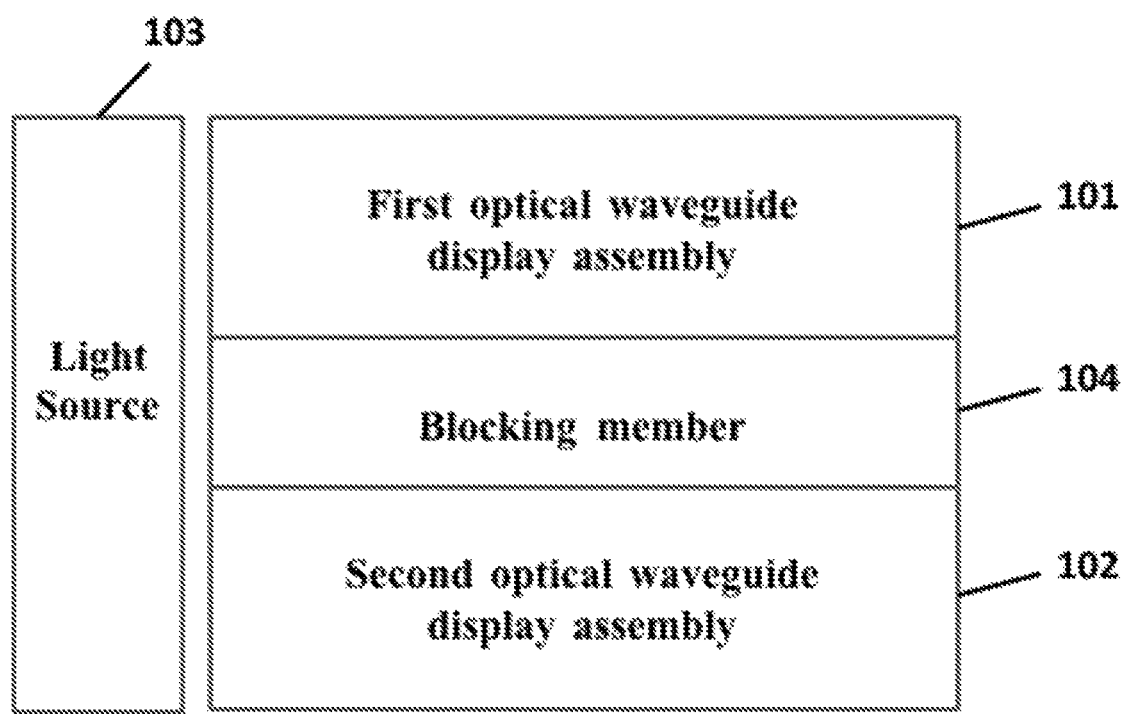
FIG. 1 is a structural diagram of a double-sided display device according to some embodiments of the present disclosure.

FIG. 1 illustrates a structural diagram of a double-sided display device according to some embodiments of the present disclosure. As shown in FIG. 1, the double-sided display device comprises a first optical waveguide display assembly 101, a second optical waveguide display assembly 102, a light source 103, and a blocking member 104.

The first optical waveguide display assembly 101 comprises a first liquid crystal layer, and the first liquid crystal layer is configured to be in a scattering state if an electric field is applied thereto.

The second optical waveguide display assembly 102 comprises a second liquid crystal layer, and the second liquid crystal layer is configured to be in a scattering state if an electric field is applied thereto. The second optical waveguide display assembly 102 is bonded to the first optical waveguide display assembly 101.

The light source 103 is disposed at a lateral side of both the first optical waveguide display assembly 101 and the second optical waveguide display assembly 102 (i.e. a side that is substantially parallel to the direction of bonding between the first optical waveguide display assembly 101 and the second optical waveguide display assembly 102). The light source 103 is configured to generate, and emit to the first optical waveguide display assembly 101 and the second optical waveguide display assembly 102, a linearly polarized light that has a first polarization direction.

The blocking member 104 is disposed between the first optical waveguide display assembly 101 and the second optical waveguide display assembly 102, and the blocking member 104 is configured to block the linearly polarized light from passing therethrough, and is further configured to be partially transparent and partially reflective to an environmental light.

The double-sided display device as described above can ensure that there is no interference between the two optical waveguide display assemblies (i.e., the first optical waveguide display assembly 101 and the second optical waveguide display assembly 102). A detailed description is provided in the following.

In the double-sided display device as described above and as illustrated in FIG. 1, when the first optical waveguide display assembly 101 is in a dark state, the liquid crystal layer (i.e., the first liquid crystal layer) in the first optical waveguide display assembly 101 is in a transmission state, and the light emitted by the light source 103 is thus transmitted in the liquid crystal layer without obstruction.

At the same time, because the light emitted by the light source 103 satisfies a condition for total reflection, the light is constrained within the first optical waveguide display assembly 101 and does not emit out of the first optical waveguide display assembly 101. As such the light does not enter the second optical waveguide display assembly 102, and thus does not cause an interference to a viewer at the side of the second optical waveguide display assembly 102.

When the first optical waveguide display assembly 101 is in a bright state, the liquid crystal layer (i.e., the first liquid crystal layer) in the first optical waveguide display assembly 101 is in a scattering state, and the light emitted by the light source 104 is thus scattered in the liquid crystal layer.

At the same time, because the condition for total reflection is not satisfied, the light can emit out of the first optical waveguide display assembly 101. Yet due to the block of the blocking member 104, the light that emits out is thus blocked from entering into the second optical waveguide display assembly 102. Therefore, the light does not cause an interference to the viewer at the side of the second optical waveguide display assembly 102.

Therefore, no matter whether the first optical waveguide display assembly 101 is in a dark state or in a bright state, the light within the first optical waveguide display assembly 101 is unable to enter the second optical waveguide display assembly 102. In a similar manner, the light within the second optical waveguide display assembly 102 is also unable to enter the first optical waveguide display assembly 101. As such, the interference between the two optical waveguide display assemblies (i.e., the first optical waveguide display assembly 101 and the second optical waveguide display assembly 102) is effectively avoided.

The double-sided display device as described above can also realize a transparent display (herein the transparent display is referred to as a case in which a viewer can see the objects behind the display assembly), and a detailed description is provided in the following.

After an environmental light emitted from or reflected by an object at one side of the second optical waveguide display assembly 102 enters the second optical waveguide display assembly 102, no matter whether the second optical waveguide display assembly 102 is in a bright state or in a dark state, at least a portion of the environmental light is able to come through and out of the second optical waveguide display assembly 102 and project onto the surface of the blocking member 104.

This is because in the bright state, a portion of the environmental light is able to come out of the second optical waveguide display assembly 102 through scattering, while in the dark state, the environmental light is able to come out of the second optical waveguide display assembly 102, due to the fact that the condition for total reflection is not satisfied.

The blocking member 104 is configured to block a linearly polarized light with the first polarization direction from passing through but still allow lights with other polarization directions to pass through. The light that is projected onto the surface of the blocking member 104 can be an environmental light, and within the environmental light, one portion of the light with the first polarization direction is thus blocked by the blocking member 104, whereas another portion of the light with the second polarization direction that is perpendicular to the first polarization direction can thus pass through the blocking member 104, enter the first optical waveguide display assembly 101, and then emit through and out of the first optical waveguide display assembly 101 to ultimately reach the viewers at the side of the first optical waveguide display assembly 101.

Similarly, as for the environmental light emitted from or reflected by an object at one side of the first optical waveguide display assembly 101, after the environmental light enters the first optical waveguide display assembly 101, no matter whether the first optical waveguide display assembly 101 is in a bright state or in a dark state, at least a portion of the environmental light is able to come through and out of the first optical waveguide display assembly 101 and project onto the surface of the blocking member 104.

As such, under the action of the blocking member 104, one portion of the light with the first polarization direction is blocked, whereas another portion of the light with the second polarization direction that is perpendicular to the first polarization direction can pass through the blocking member 104, enter the second optical waveguide display assembly 102, and then emit through and out of the second optical waveguide display assembly 102 to ultimately reach the viewers at the side of the second optical waveguide display assembly 102.

Taken the above together, a transparent display for the double-sided display device can be realized.

Compared with existing double-sided display technologies, the double-sided display device as disclosed herein can display different images at each of the two different sides of the double-sided display device, which can greatly reduce the number of display devices. At the same time, there is no interference between the two display assemblies of the transparent double-sided display, which can realize a satisfactory display effect.

It is noted that besides the double-sided display device as described above, one optical waveguide display assembly that has a substantially similar structure as the optical waveguide display assembly 101 and the second optical waveguide display assembly 102 in the aforementioned double-sided display device can be used in a single-sided display device.

Specifically, the single-sided display device includes an optical waveguide display assembly. The optical waveguide display assembly includes a pixel electrode substrate and a common electrode substrate, oppositely aligned such that the pixel electrode substrate and the common electrode substrate are respectively closer to the display surface and to the back surface.

The optical waveguide display assembly further includes a liquid crystal layer, sandwiched between, and configured to be in a scattering state if an electric field is applied to, the pixel electrode substrate and the common electrode substrate, and a light source disposed at a lateral side of the display assembly, which is configured to generate, and emit into the optical waveguide display assembly, a linearly polarized light having a first polarization direction.

The display assembly further includes a blocking member disposed at the side of the back surface, which is configured to block a light having the first polarization direction to, and to allow a light having a second polarization direction perpendicular to the first polarization direction to pass therethrough.

In addition to the optical waveguide display assembly, the single-sided display device further includes a transparent substrate, which is disposed over the back surface and opposing to the display surface of the one optical waveguide display assembly.

As such, a viewer can normally watch images displayed from a side of the display surface of the single-sided display device, yet can only see through the single-sided display device from a side of the back surface thereof.

In some embodiments of the double-sided display device, the first optical waveguide display assembly 101 and the second optical waveguide display assembly 102 can be separated from each other, that is, each of the two optical waveguide display assemblies has its own common electrode substrate, pixel electrode substrate and liquid crystal layer.

By configuring a common electrode substrate separately for the first optical waveguide display assembly 101 and the second optical waveguide display assembly 102, the distance between the liquid crystal layer of the one optical waveguide display assembly and the common electrode in the other optical waveguide display assembly is increased, thus the interference of the electric field of the common electrode in the other optical waveguide display assembly to the state of the liquid crystal layer of the one optical waveguide display assembly is reduced. As such, the display effect can be improved.

In some other embodiments of the double-sided display device, a common electrode layer disposed over the common electrode substrate is configured to be commonly shared by both the first optical waveguide display assembly 101 and the second optical waveguide display assembly 102. As such, a thickness and a weight of the double-sided display device can be reduced, realizing a lighter and thinner display device.

Figure 2A:
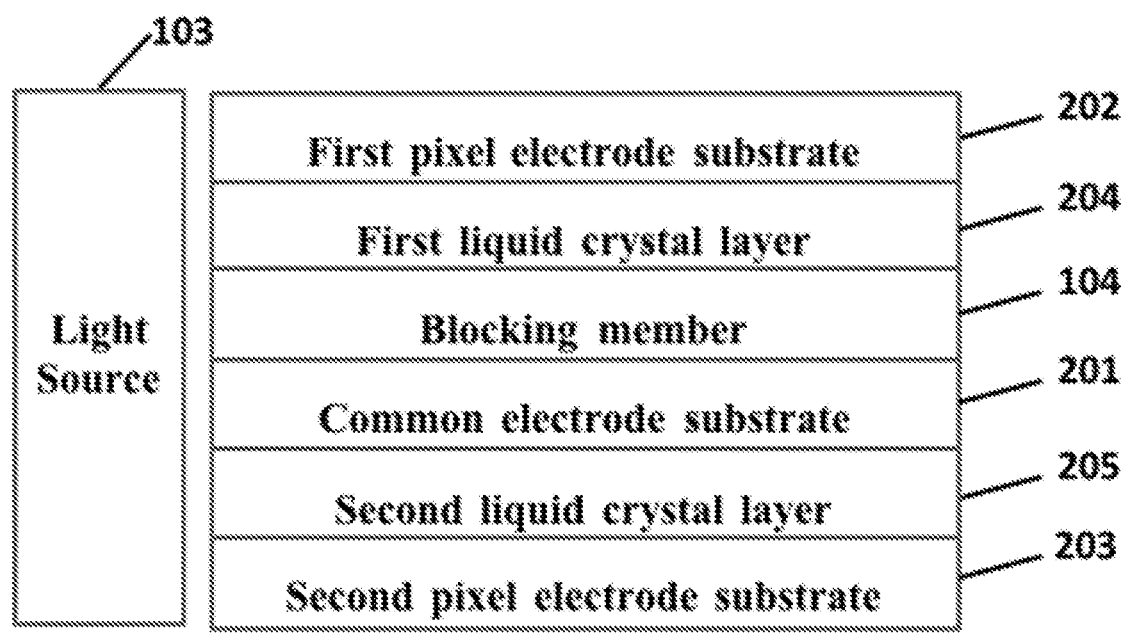
FIG. 2A is a structural diagram of a double-sided display device according to a second embodiment of the present disclosure.
Figure 2B:
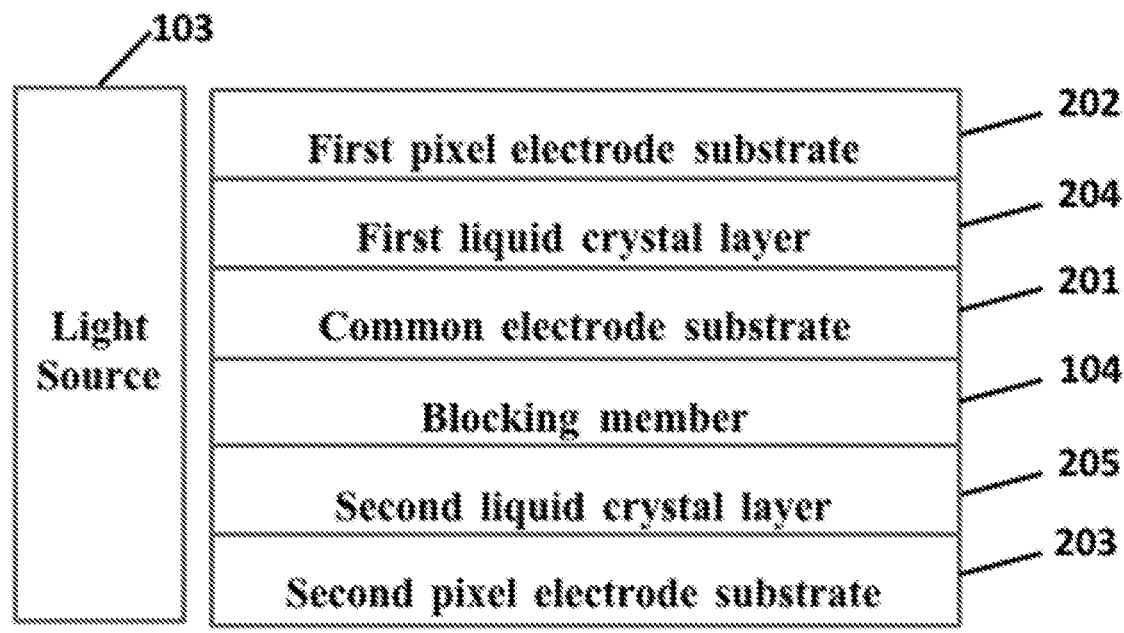
FIG. 2B is a structural diagram of a double-sided display device according to a third embodiment of the present disclosure.

FIG. 2A and FIG. 2B illustrate two different embodiments of the double-sided display device. As shown in FIG. 2A and FIG. 2B, the double-sided display devices according to these two embodiments of the present disclosure both comprise a common electrode substrate 201, a first pixel electrode substrate 202, a second pixel electrode substrate 203, a first liquid crystal layer 204, a second liquid crystal layer 205, a light source 103, and a blocking member 104.

The common electrode substrate 201 is provided with common electrodes, and the common electrode substrate 201 is configured to block a light with a first polarization direction from passing through.

The first pixel electrode substrate 202 and the second pixel electrode substrate 203 are disposed at two sides of the common electrode substrate 201 respectively, wherein the first pixel electrode substrate 202 comprises first pixel electrodes, and the second pixel electrode substrate 203 comprises second pixel electrodes.

The first liquid crystal layer 204 is disposed between the common electrode substrate 201 and the first pixel electrode substrate 202, and is configured to be in a scattering state when an electric field is applied thereto. The first liquid crystal layer 204, together with the common electrode substrate 201 and the first pixel electrode substrate 202, form a first optical waveguide display assembly 101.

The second liquid crystal layer 205 is disposed between the common electrode substrate 201 and the second pixel electrode substrate 203, and is configured to be in a scattering state when an electric field is applied thereto. The second liquid crystal layer 205, together with the common electrode substrate 201 and the second pixel electrode substrate 203, form a second optical waveguide display assembly 102.

The light source 103 is disposed at a lateral side of the first optical waveguide display assembly 101 and the second optical waveguide display assembly 102 (i.e. a side that is parallel to the stacking direction of the various film layers), and is configured to generate, and to emit to the first liquid crystal layer and the second liquid crystal layer, a linearly polarized light with a first polarization direction;

The blocking member 104 can be disposed at any one of the two sides of the common electrode substrate 201, and is configured to block a linearly polarized light from passing therethrough from the first polarization direction (In FIG. 2A, it is closer to the first liquid crystal layer 204, and in FIG. 2B, it is closer to the second liquid crystal layer 205), and is configured to be partly transparent and partly reflective to an environmental light.

Compared with the embodiments of the double-sided display device as described above and illustrated in FIG. 1, in which each of the optical waveguide display assemblies (i.e., the first optical waveguide display assembly 101 and the second optical waveguide display assembly 102) has its own common electrode substrate, each of the two embodiments of the double-sided display devices as respectively shown in FIG. 2A and FIG. 2B contains one less piece of the common electrode substrate. Thus the thickness and the weight of the double-sided display device is reduced, leading to a lighter and thinner display device.

In the above two embodiments of the double-sided display devices as respectively shown in FIG. 2A and FIG. 2B, the blocking member 104 is separated from any of the components (e.g., the pixel electrode substrate, the common electrode substrate) of any one of the two optical waveguide display assemblies, i.e., the blocking member 104 is a component in the double-sided display device that is independent from the two optical waveguide display assemblies.

In order to further reduce the thickness and weight of the double-sided display device, the present disclosure further provides a double-sided display device according to yet another embodiment of the present disclosure, in which the blocking member substantially comprises a metal wire grid polarizer that is formed in the common electrode layer. The transmission axis of the metal wire grid polarizer is configured to be perpendicular to the first polarization direction.

Because the blocking member is a metal wire grid polarizer, it can conduct electric currents, therefore an electric field can be formed in the liquid crystal layer by applying electrical signals to the metal wire grid polarizer. As such, one functional layer can realize both the function of common electrodes and the function of blocking linearly polarized light at the same time. Therefore, such a configuration not only can further reduce the thickness and weight of the double-sided display device, but also can simplify the manufacturing process.

The present disclosure further provides a double-sided display device according to some other embodiments of the present disclosure, in which the effective display areas of the two optical waveguide display assemblies (i.e. the first optical waveguide display assembly and the second optical waveguide display assembly) are configured to be separated to thereby further avoid the interference in between.

In one of the above embodiments of the double-sided display device in which common electrodes are shared, the effective display areas of the two optical waveguide display assemblies can be separated by configuring that the pixel electrodes of the two optical waveguide display assemblies have different locations, i.e., the orthographic projections of first pixel electrodes in the first optical waveguide display assembly over the common electrode substrate and the orthographic projections of second pixel electrodes over the common electrode substrate are not overlapped with each other.

FIGS. 3A-3E illustrate various possible configurations of pixel electrodes in the double-sided display device according to some of the above mentioned embodiments of the present disclosure.

Figure 3A:
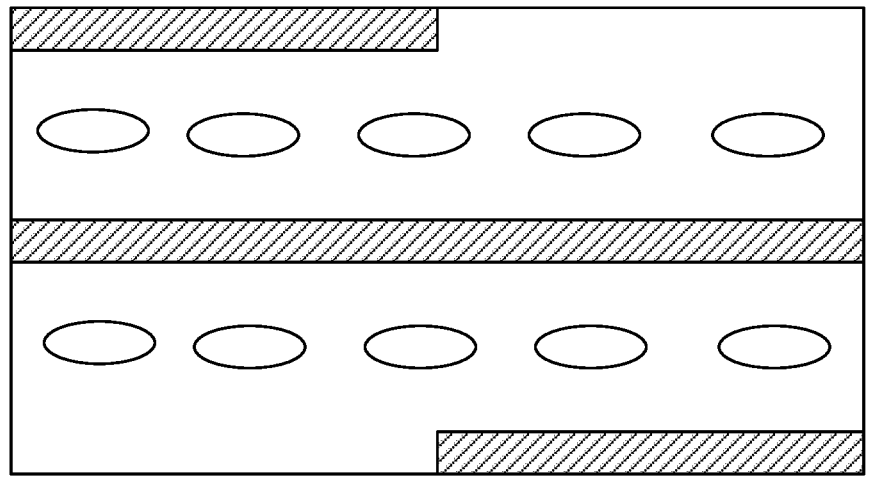
FIG. 3A-3E are diagrams illustrating the correspondence relationship between the first pixel electrode and the second pixel electrode in the optical waveguide display assembly in the double-sided display device according to some embodiments of the present disclosure.
Figure 3B:
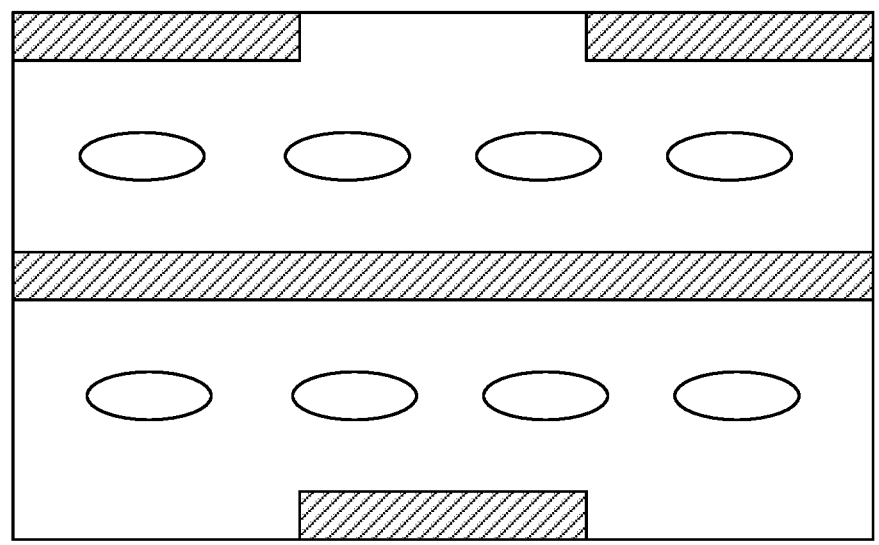
Figure 3C:
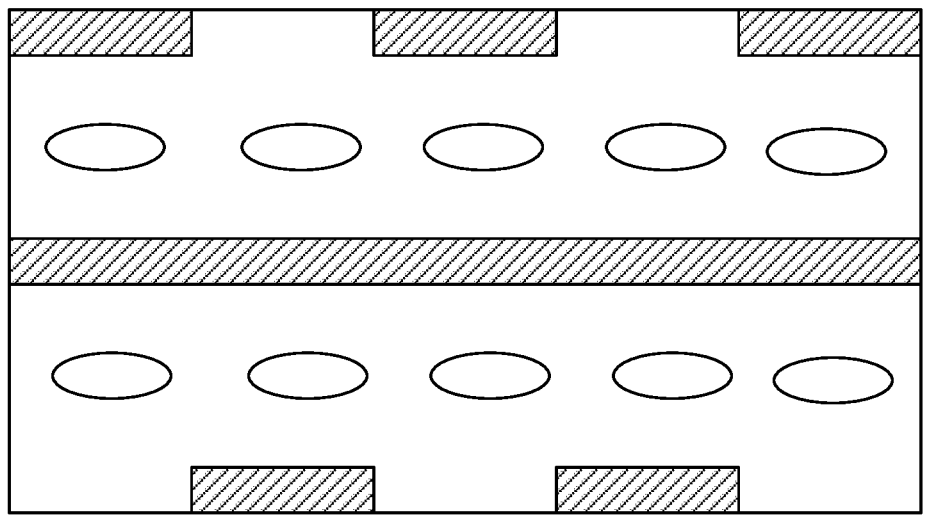
Figure 3D:
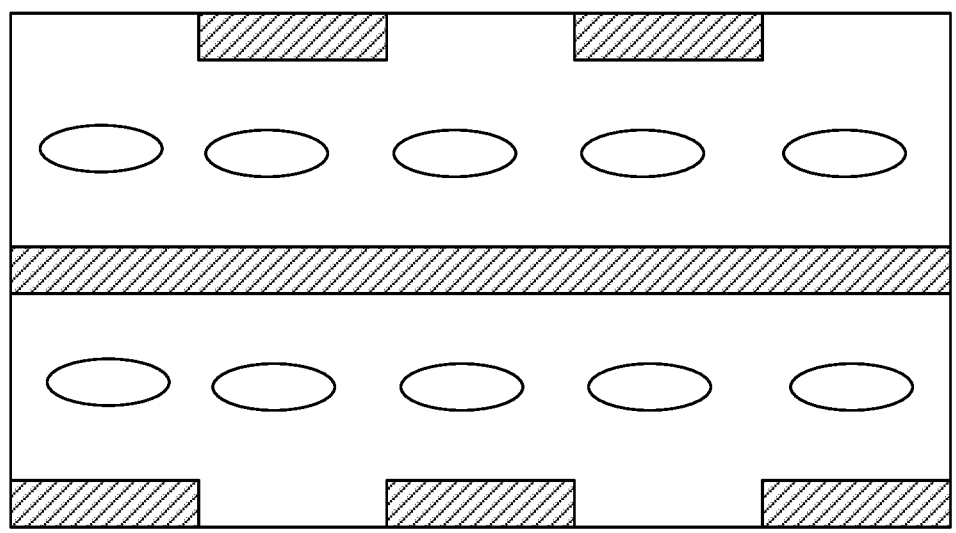
Figure 3E:
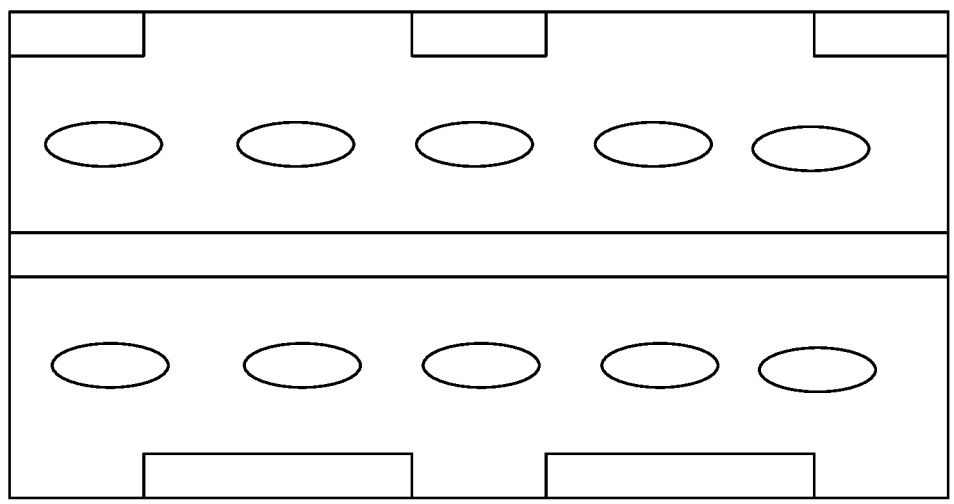

In the embodiment of the double-sided display device as shown in FIG. 3A, the first pixel electrodes and the second pixel electrodes are of a substantially same number, and each of the first pixel electrodes and each of the second pixel electrodes are of a substantially same size;

In the embodiment of the double-sided display device as shown in FIG. 3B, each of the first pixel electrodes and each of the second pixel electrodes are of a substantially same size, and the first pixel electrodes are of a relatively larger number than the second pixel electrodes;

In the embodiment of the double-sided display device as shown in FIG. 3C, each of the first pixel electrodes and each of the second pixel electrodes are of a substantially same size, and the first pixel electrodes are of a relatively larger number than the second pixel electrodes;

In the embodiment of the double-sided display device as shown in FIG. 3D, each of the first pixel electrode and each of the second pixel electrode are of a substantially same size, and the second pixel electrodes are of a relatively larger number than the first pixel electrodes;

In the embodiment of the double-sided display device as shown in FIG. 3E, neither the size nor the number of the first pixel electrodes and the second pixel electrodes are the same.

It is noted that the designs of pixel electrodes in the above mentioned embodiments of the double-sided display device represent only some, but not all, of the possible designs for the first pixel electrodes and the second pixel electrodes, and shall not impose a limitation to the scope of the present disclosure. The design can be adjusted according to practical needs.

In the above embodiments of the double-sided display device as provided in the present disclosure, the first liquid crystal layer and the second liquid crystal layer can both comprise macromolecule polymer molecules and liquid crystal particles which are dispersed in the macromolecule polymer molecules.

What impacts the light is the liquid crystal layer in the optical waveguide display assembly, thus as for the liquid crystal layer, the two portions of the liquid crystal layer (i.e., the macromolecule polymer molecules, and the liquid crystal particles dispersed in the macromolecule polymer molecules) are configured to have the following characteristics: when an electric field is applied, the refractive index of the liquid crystal particles and the refractive index of the macromolecule polymer molecules are different, and when no electric field is applied, the refractive index of the liquid crystal particles and the refractive index of the macromolecule polymer are substantially same.

The liquid crystal layer can comprise macromolecule polymer stabilized liquid crystals (PSLC) according to one embodiment.

The liquid crystal layer can comprise: nematic liquid crystals and long-chain compound molecules (i.e., the macromolecular polymer molecules) dispersed in the nematic liquid crystals according to some other embodiments. The long-chain compound molecules are configured to keep the nematic liquid crystals in a scattering state, and are further configured such that the long chain thereof is perpendicular to the display areas of the two optical waveguide display assemblies.

The long-chain compound molecules can comprise a plurality of monomers, wherein each monomer can comprise any one or any combination of the following:

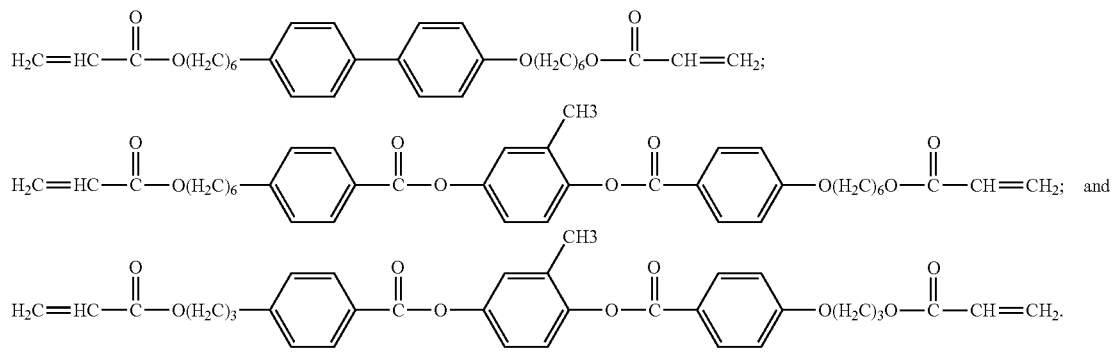

The long-chain compound can comprise any one or any combination of the following:

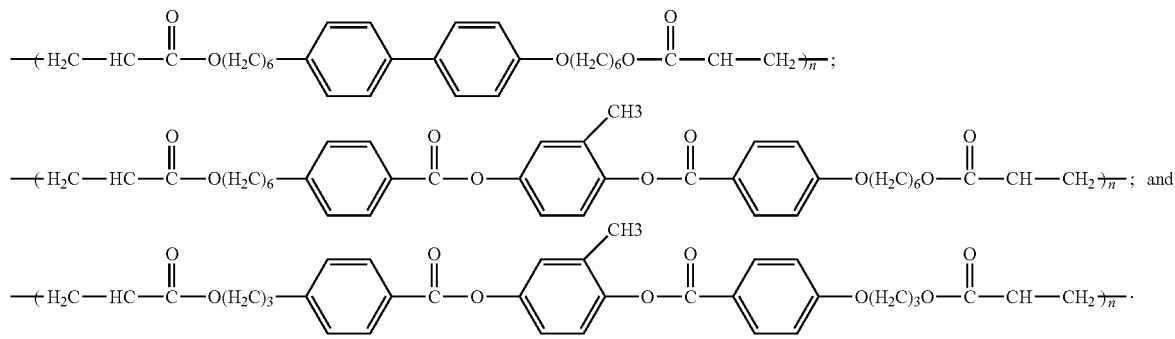

The nematic liquid crystals can comprise any one or any combination of the following liquid crystal molecule:

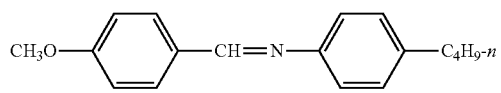

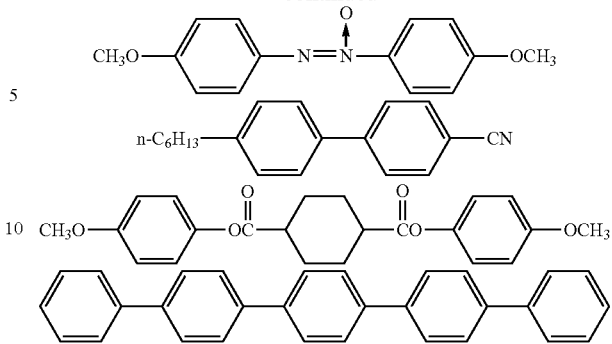

It is noted that in the embodiments of the present disclosure as described above, there are no limitations to the manner of formation of the liquid crystal layer.

The following is a manner for forming the liquid crystal layer: after the monomer molecules and the liquid crystals are mixed together, the mixture is exposed to an ultra-violet light such that the monomer molecules can polymerize into macromolecule polymer molecules.

During the polymerization process when the macromolecule polymer molecules are formed, the liquid crystals and the macromolecule polymer molecules are separated to thereby form many small liquid crystal particles, and the small liquid crystal particles are constrained or fixed by the macromolecule polymer molecules.

When an electric field is applied to the liquid crystal layer, because of the presence of the macromolecule polymer molecules, the orientation of the liquid crystals in the liquid crystal layer is not orderly, resulting in a difference of the refractive rate between the liquid crystals and the macromolecule polymer molecules. As a consequence, the light incident into the liquid crystal layer is refracted and reflected at the surface of the liquid crystal particles, the condition of total reflection for at least one portion of the light is thus not satisfied. After multiple times of refractions and reflections, the at least one portion of light is able to emit out of the liquid crystal layer, thereby the bright state of the optical waveguide display assemblies is formed.

When there is no electric field applied to the liquid crystal layer, the refractive rates of the liquid crystals and the refractive rate of the macromolecule polymer molecules are substantially same, thus the liquid crystal layer is transparent to the light. As a consequence, the condition of total reflection for the light is maintained, and the light is thereby constrained within the liquid crystal layer of the optical waveguide display assembly, and is thus unable to emit out of the liquid crystal layer, thereby the dark state of the optical waveguide display assemblies is formed.

Figure 4:
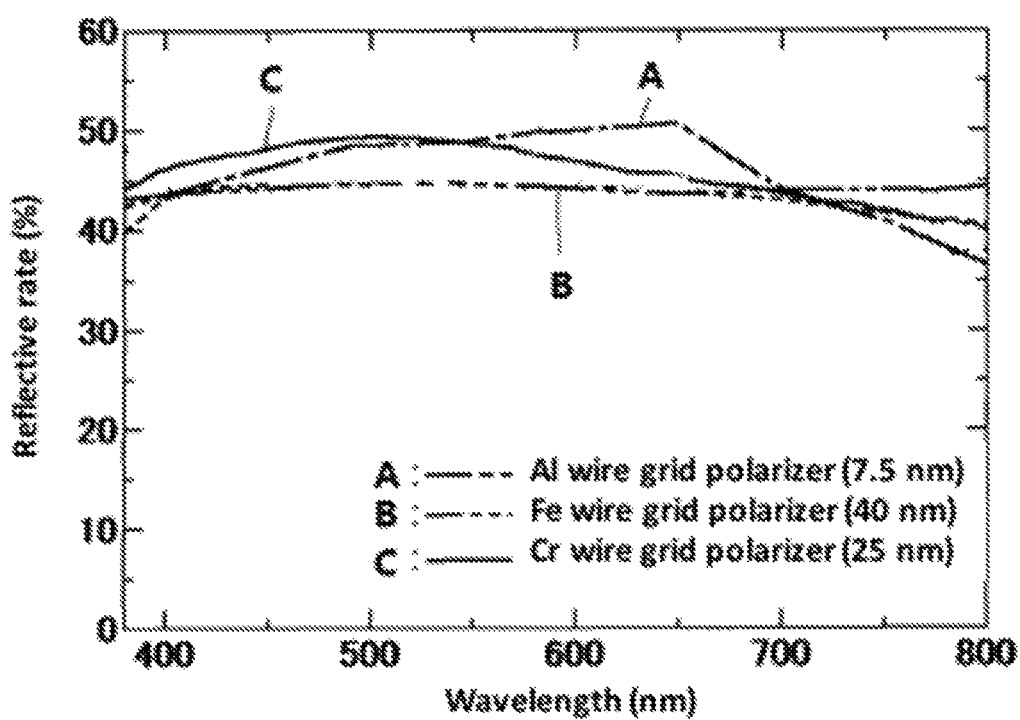
FIG. 4 illustrates diagrams of the wavelength-reflective rate relationship for the metal wire grid polarizer on the common electrode layer that is made with different types of metals in the double-sided display device according to some embodiments of the present disclosure.

Depending on different embodiments of the present disclosure, the manufacturing material of the partially transparent and partially reflective common electrode layer can be Al, Fe, Cr, or a combination (i.e., an alloy) thereof. FIG. 4 illustrates diagrams of the wavelength-reflective rate relationship for the metal wire grid polarizer on the common electrode layer that is made with different types of metals in the double-sided display device according to some embodiments of the present disclosure.

As illustrated in FIG. 4, the curves A, B and C respectively represent diagrams of the wavelength-reflective rate relationship of the metal wire grid polarizers made with Al, Fe and Cr. Based on the results shown in FIG. 4, it can be found that the partially transparent and partially reflective characteristics can be realized if a thickness of the metal wire grid polarizer made with Al is 7.5 nm, or if a thickness of the metal wire grid polarizer made with Fe is 40 nm, or if a thickness of the metal wire grid polarizer made with Cr is 25 nm.

Typically during a manufacturing process of a film layer, the manufacturing precision is relatively more difficult for control if the film layer has a relatively small thickness. The reflective rate is thus largely influenced by even a slight change of the thickness of the film layers. As such, if the error of manufacturing is 1.5 nm, when manufacturing the metal wire grid polarizer with a thickness of 7.5 nm, the error rate can reach as high as 20%; whereas the error rate for manufacturing the metal wire grid polarizer with a thickness of 25 nm is only 6%, and the error rate for manufacturing the metal wire grid polarizer with a thickness of 40 nm is less than 4%.

On the other hand, although the thickness of a film layer with Fe is relatively easy to control during the manufacturing process, a complex antirust treatment is needed when manufacturing the partially transparent and partially reflective common electrode layer made with Fe. Otherwise, it can easily become rusted in a short time to thereby influence the reflective rate.

As such, the embodiment of the double-sided display device with the partially transparent and partially reflective common electrode layer manufactured with Cr has advantages such as a relatively large thickness and an easy-to-manage thickness during manufacturing. In addition, the double-sided display device with the partially transparent and partially reflective common electrode layer manufactured with Cr requires little or no antirust treatment.

Due to an attenuation effect of a light transmitted in the optical waveguide display assembly, the more distant the pixels are from the light source, the weaker the light that is incident into the pixels. Consequently, if a same electrical signal is applied to different pixels, these different pixels have a different brightness, which in turn negatively affects the display uniformity of the display device.

In some embodiments of the present disclosure, the scattering power of the first and/or second optical waveguide display assembly is also configured according to the distances of regions of the first and/or second optical waveguide display assembly to the light source.

Specifically, it is configured such that the more distant a region of the first and/or second optical waveguide display assembly is from the light source, the stronger the scattering power of the optical waveguide display assembly, so as to compensate for the attenuation effect of light. As such, the display uniformity of the display device can be improved.

Herein the scattering power is referred to as the ability to alter angles of incident lights and to destroy the conditions of total reflection.

Figure 6:
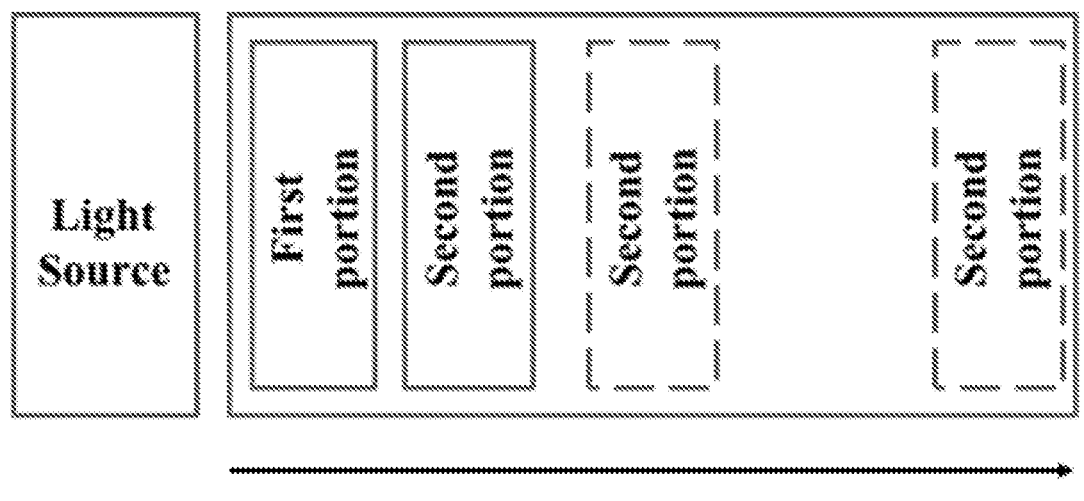
FIG. 6 is a diagram illustrating the locations of different portions in the optical waveguide display assemblies according to some embodiments of the present disclosure.

In a specific embodiment as illustrated in FIG. 6, a display area of the first and/or second optical waveguide display assembly comprises two regions (i.e., a first region and a second region) of a substantially same area, corresponding respectively to a first portion and a second portion of the first and/or second optical waveguide display assembly, and the first region is relatively closer to the light source than the second region.

In order to compensate the above mentioned attenuation effect of the light emitted from the light source and transmitting in the first optical waveguide display assembly and/or the second optical waveguide display assembly, it is configured such that a scattering power of the first portion of the first optical waveguide display assembly and/or the second optical waveguide display assembly is weaker than the scattering power of the second portion of the first optical waveguide display assembly and/or the second optical waveguide display assembly.

It should be noted that the above comparison is directed only to the scattering power of different portions of a same optical waveguide display assembly, but not to the scattering power of different portions of different optical waveguide display assembly. As such, the above description can comprise the following three cases:

1). The scattering power of the first portion of the first optical waveguide display assembly is weaker than the scattering power of the second portion of the first optical waveguide display assembly, and the scattering power of each portion of the second optical waveguide display assembly is substantially same;

2). The scattering power of the first portion of the second optical waveguide display assembly is weaker than the scattering power of the second portion of the second optical waveguide display assembly, and the scattering power of each portion of the first optical waveguide display assembly is substantially same; and 3). The scattering power of the first portion of the first optical waveguide display assembly is weaker than the scattering power of the second portion of the first optical waveguide display assembly, and the scattering power of the first portion of the second optical waveguide display assembly is weaker than the scattering power of the second portion of the second optical waveguide display assembly.

Other cases are also possible, and there are no limitations herein.

As illustrated in FIG. 6, relative to the first portion, the second portion can be located at a different location in the display area, as long as the distance between the second portion and the light source is larger than the distance between the first portion and the light source.

In the following descriptions, the first optical waveguide display assembly and the second optical waveguide display assembly will not be distinguished, and the optical waveguide display assembly as mentioned or described will be referred to the first optical waveguide display assembly and/or the second optical waveguide display assembly.

Differing from existing technologies, which typically applies a technological approach by compensating for signals to thereby ensure the display uniformity of a conventional display device, the present disclosure employs a different approach, by altering the structure and/or the functionality of the optical waveguide display assemblies.

Specifically, the optical waveguide display assemblies as described above are configured to have different scattering power according to the distance from the light source, such that a portion of an optical waveguide display assembly that is closer to the light source has a weaker scattering power than a portion of the optical waveguide display assembly that is farther from the light source. As such, the attenuation effect of the light emitted from the light source and transmitting in the optical waveguide display assembly can be compensated for, thereby improving the display uniformity of the display device.

Given a substantially same electrical signal, in order to compensate for the difference in the light transmitting in the display assembly that is caused by the difference in distance from the light source, it need to be configured such that a portion of the optical waveguide display assembly that is farther from the light source has a stronger scattering power. Multiple approaches can be applied to realize a change of the scattering power of a region of the optical waveguide display assembly according to a location of the region in the optical waveguide display assembly, which are respectively described in the following embodiments.

Embodiment 1

Figure 5:
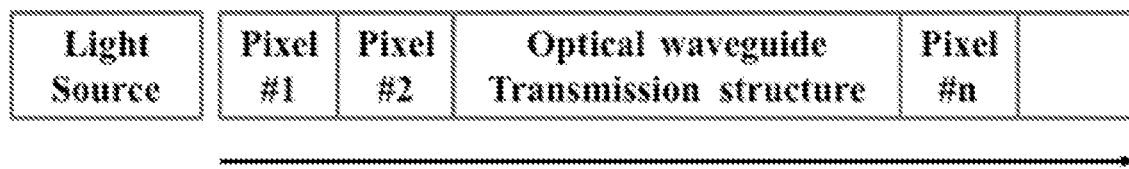
FIG. 5 is a structural diagram of an optical waveguide display assembly.

As for the optical waveguide display assembly as shown in FIG. 5, the working principle is as follows: by applying an electrical signal to the common electrodes and the pixel electrodes, an electric field is formed, which acts on the liquid crystal layer to thereby alter a state of the liquid crystal layer. As such, the larger a region of the liquid crystal layer that is influenced by the electric field, the more the liquid crystal particles whose state is changed, thus the stronger the scattering power of the region to the light.

Therefore, in embodiment 1, it can be configured such that electrodes in different regions have a different area depending on different distances of the different regions from the light source.

It is noted that in portions of the display assembly that are not covered by electrodes, electric fields cannot be generated to influence the liquid crystal layer corresponding to theses portions of the display assembly. Therefore, these portions of the liquid crystal layer do not participate in the scattering of the light, and thus have a reduced scattering power.

It is further noted that because the common electrodes need to have both the function of reflection and the function of blocking the linearly polarized light, the pixel electrodes can be changed.

As described above, when a same electrical signal is applied, on the one hand, the larger the area of the pixel electrodes, the larger the area of the liquid crystal layer that is influenced by the electrical signal, the stronger the scattering power of the corresponding liquid crystal layer. On the other hand, the smaller the area of the pixel electrodes, the smaller the area of the liquid crystal layer that is influenced by the electrical signal, and the weaker the scattering power of the corresponding liquid crystal layer.

In order to compensate for the attenuation effect of light transmitting in the display assembly to thereby ensure a display uniformity of the display device, it needs to be configured such that a first portion of the optical waveguide display assembly corresponding to a first region that is closer to the light source has a weaker scattering power that a second portion of the optical waveguide display assembly corresponding to a second region that is farther from the light source. Accordingly, in embodiment 1, the pixel electrodes in a first region closer to the light source can be configured to have a smaller area than the pixel electrodes in a second region farther from the light source.

Therefore, if the voltage of the electrical signal applied to the pixel electrode is substantially same, it can be ensured the scattering power of the first portion of the optical waveguide display assembly is weaker than the scattering power of the second portion of the optical waveguide display assembly.

It should be further noted that in some embodiments of the present disclosure, this above mentioned manner of compensation can be configured only for some specific regions, but such configuration can also be for all regions so that display uniformity can be improved as much as possible.

Embodiment 2

As for the optical waveguide display assembly as shown in FIG. 5, the larger a region of the liquid crystal layer that is influenced by the electric field applied thereupon, the more the liquid crystal particles whose state is changed, thus the stronger the scattering power of the region to the light.

In the optical waveguide display assembly disclosed herein, when an electric field is applied to the liquid crystal layer, because of the presence of the macromolecule polymer molecules, the orientation of the liquid crystal particles in the liquid crystal layer is not orderly, resulting in a difference of the refractive rate between the liquid crystal particles and the macromolecule polymer molecules. As a consequence, the light incident into the liquid crystal layer is refracted and reflected at the surface of the liquid crystal particles, the condition of total reflection for at least one portion of the light is not satisfied. Thus after multiple times of refractions and reflections, the at least one portion of light is able to emit out of the liquid crystal layer, thereby the bright state of the optical waveguide display assemblies is formed.

When there is no electric field applied to the liquid crystal layer, the refractive rates of the liquid crystal particles and the refractive rate of the macromolecule polymer molecules are substantially same, thus the liquid crystal layer is transparent to the light. As a consequence, the condition of total reflection for the light is maintained, and the light is thereby constrained within the optical waveguide display assembly and cannot emit out of the liquid crystal layers, thereby the dark state of the optical waveguide display assemblies is formed.

As such, if a uniform design is applied to the electrodes (that is, different regions of the electrodes have substantially same area), and the electrical signals applied to the electrodes are configured to be substantially same, the scattering power of the portions of the optical waveguide display assembly depends on the distribution of the macromolecule polymer molecules in corresponding regions: the higher the concentration of the macromolecule polymer molecules in a certain region, the stronger the influence of macromolecule polymer molecules on the orientation of the liquid crystal particles, the larger the number of liquid crystal particles that are influenced by the electrical signal, and the larger the number of times of reflections and refractions of light in the region, and then the more the light emitting out of the optical waveguide display assembly.

Therefore, in embodiment 2, it can be configured such that a first portion of the optical waveguide display assembly that corresponds to a first region comprises a lower concentration of the macromolecule polymer molecules than a second portion of the optical waveguide display assembly that corresponds to a second region, wherein the first region is closer to the light source than the second region.

Because the concentration of macromolecule polymer molecules in the first portion of the optical waveguide display assembly is lower, the number of liquid crystal particles influenced by the electrical signals is smaller. Thus if the voltages of the electrical signals applied to the pixel electrodes are substantially same, the scattering power of the first portion of the optical waveguide display assembly is weaker than the scattering power of the second portion of the optical waveguide display assembly.

As such, the optical waveguide display assembly according to embodiment 2 of the present disclosure comprises a display area, which comprises two regions (i.e., the first region and the second region) of a substantially same area, the concentration of the macromolecule polymer molecules in the first portion of the optical waveguide display assembly is lower than the concentration of the macromolecule polymer molecules in the second portion of the optical waveguide display assembly. Herein, the first portion of the optical waveguide display assembly corresponds to the first region among the two regions that is closer to the light source, and the second portion of the optical waveguide display assembly corresponds to the second region among the two regions that is farther from the light source.

It should be noted that a concentration of a substance is referred to as the amount of the substance per unit volume. Specifically, in the present disclosure, the concentration of the macromolecule polymer molecules is referred to as the number of macromolecule chains per unit volume.

It should be further noted that in some embodiments of the present disclosure, this above mentioned manner of compensation can be configured for some specific regions only, but such configuration can also be for all regions so that display uniformity can be improved as much as possible.

Figure 7:
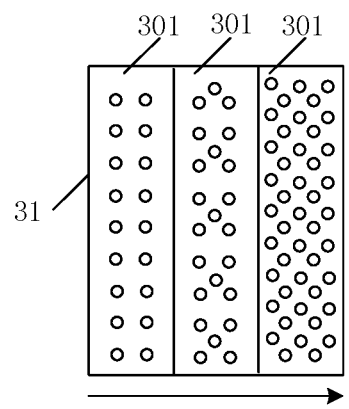
FIG. 7 is a diagram illustrating the concentration relationship of the macropolymer in different regions in the optical waveguide display assemblies according to some embodiments of the present disclosure.

In some embodiments of the optical waveguide display assembly as illustrated in FIG. 7, the display area can be rectangular. The display area comprises a first side neighboring the light source, and the display area is divided into a plurality of continuously distributed regions with a substantially same area and in a direction that is perpendicular to the first side and parallel to the display area. It is configured such that in any two neighboring regions, a concentration of the macromolecule polymer molecules in a region that is closer to the first side is smaller than a concentration of the macromolecule polymer molecules in a region that is farther from the first side.

As shown in FIG. 7, in the direction from the left to the right, the longer the distance from the light source, the larger the concentration of the macromolecule polymer molecules. Therefore, although the incident light in each region becomes weaker and weaker during transmission in the direction from left to right, because the concentration of the corresponding macromolecule polymer molecules is getting larger and larger in the left-to-right direction, the influence exerted by the macromolecule polymer molecules to the liquid crystal particles becomes stronger and stronger under the application of same electrical signals.

Therefore, in the left-to-right direction, the number of liquid crystal particles that are influenced becomes larger and larger, and correspondingly the scattering power becomes stronger and stronger, thereby making a compensation for the situation that the incident light becomes weaker and weaker, and resulting in a relatively stable emission of the light.

In some embodiments of the optical waveguide display assembly, in order to improve the light utilization rate and to increase the display brightness, the aforementioned optical waveguide display assembly further comprises a reflector, which is disposed on a side of the display area opposing to the light source, and is configured to reflect the light back into the optical waveguide transmission structure to thereby improve the utilization rate of the light and to increase the display brightness.

In the above two embodiments (embodiment 1 and embodiment 2) of the optical waveguide display assembly, through the manners as described above in the two embodiments, when the voltages of the electrical signals applied to the pixel electrodes are substantially same, the difference between the brightness of the pixels corresponding to the first portion of the optical waveguide display assembly and the brightness of the pixels corresponding to the second portion of the optical waveguide display assembly is configured to be smaller than a preset threshold, so that display uniformity of the display assembly is ensured.

Figure 8:
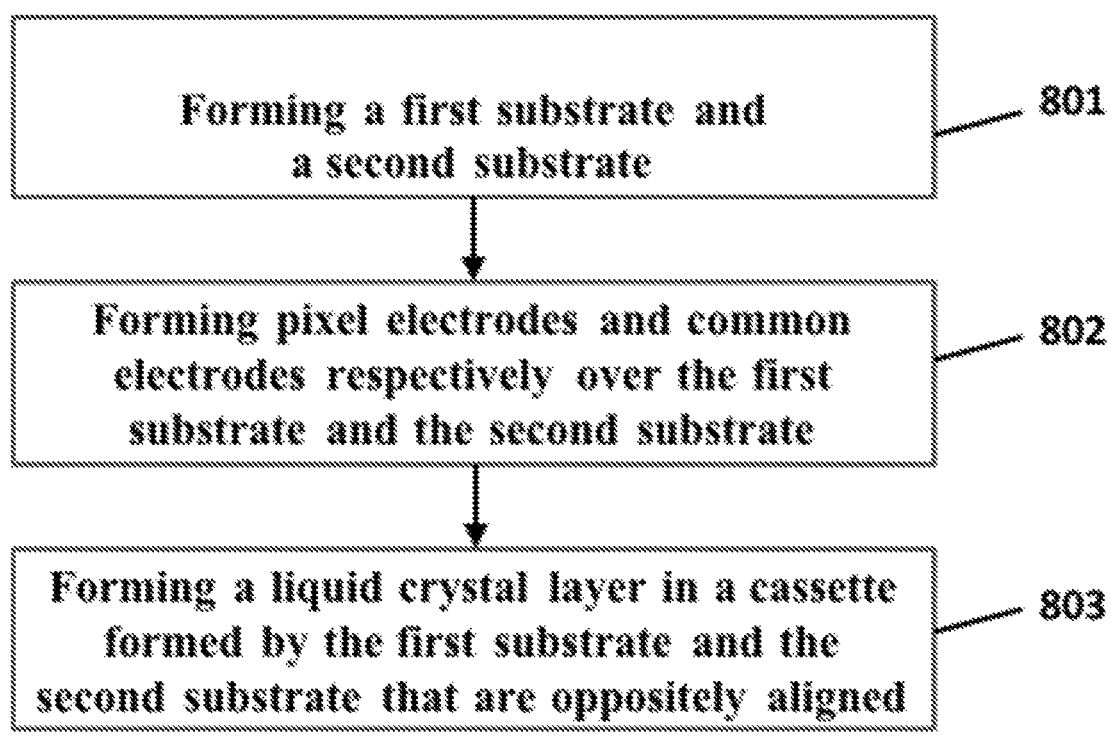
FIG. 8 is a flowchart illustrating the manufacturing methods of the optical waveguide display assemblies according to some embodiments of the present disclosure.

In the above mentioned embodiment 2 of the present disclosure, the display uniformity of the display assembly can be improved through changing the concentration of the macromolecule polymer molecules in the liquid crystal layer of the optical waveguide display assembly. Herein the present disclosure further provides a manufacturing method for the optical waveguide display assembly, as illustrated in FIG. 8. The method comprises:

Step 801: forming a first substrate and a second substrate;

Step 802: forming pixel electrodes and common electrodes respectively over the first substrate and the second substrate; and Step 803: forming a liquid crystal layer in a cassette formed by the first substrate and the second substrate that are oppositely aligned.

The display area comprises two regions with s substantially same area, and is configured such that a concentration of the macromolecule polymer molecules in the first portion of the liquid crystal layer is lower than a concentration of the macromolecule polymer molecules in the second portion of the liquid crystal layer, wherein the first portion of the liquid crystal layer corresponds to the region among the two regions that is closer to the light source (i.e. the first region), and the second portion of the liquid crystal layer corresponds to the region among the two regions farther from the light source (i.e. the second region).

In some embodiments of the present disclosure, different mixtures of the liquid crystals and monomers can be employed for different regions to thereby control the concentration of macromolecule polymer molecules. For example, a plurality of chambers can be arranged in the optical waveguide display assembly, and a different mixture of the liquid crystals and the monomers can be injected in each chamber, such that the farther the chamber that is from the light source, the higher the concentration of the monomers in the mixture.

In another embodiment of the present disclosure, the concentration of the polymer formed in different regions is controlled according to the distance between the different regions and the light source. Because the concentration of the macromolecule polymer can be controlled by means of altering reaction parameters in the polymerization process, there is no need to prepare special mixture of liquid crystal and monomer for each region, therefore reducing the manufacturing difficulties.

In the method as described above, the step of forming a liquid crystal layer in a cassette formed by the first substrate and the second substrate that are oppositely aligned (i.e., S803) can specifically comprise:

Forming a mixture of liquid crystals and monomers; and

Exposing the mixture in an ultra-violet light such that the monomers dispersed therein polymerize in a polymerization process to thereby form macromolecule polymer molecules.

Herein, the macromolecule polymer molecules in the first portion of the liquid crystal layer that corresponds to the first region are configured to have a lower concentration than the macromolecule polymer molecules in the second portion of the liquid crystal layer that corresponds to the second region, realized by controlling reaction parameters of the polymerization process.

Herein the reaction parameters can comprise at least one of polymerization temperature, exposure time, and exposure intensity, and the sub-step of controlling the reaction parameters of the polymerization process can comprise any one of a combination of the following cases:

a polymerization temperature for the first region can be controlled to be lower than a polymerization temperature for the second region; or an exposure time period for the first region can be controlled to be shorter than an exposure time period for the second region; or an exposure intensity for the first region can be controlled to be weaker than an exposure intensity for the second region.

In one embodiment as an illustrating example, in the polymerization process, the ultra-violet light of a substantially same intensity is employed to expose the whole liquid crystal layer, with an exposure time period for the first region of the liquid crystal layer being controlled to be shorter than an exposure time period for the second region of the liquid crystal layer.

Alternatively, in another embodiment as another illustrating example, in the polymerization process, the whole liquid crystal layer is exposed with the ultra-violet light within a substantially same time period, with an intensity of the ultra-violet light applied to the first portion of the liquid crystal layer being controlled to be lower than an intensity of the ultra-violet light for the second region of the liquid crystal layer.

Thus in these above two embodiments of the method, only one mixture is needed, and the concentration of the macromolecule polymer molecules in different regions of the liquid crystal layer can be controlled by managing the exposure time or the exposure intensity.

In some embodiments of the present disclosure, the optical waveguide display assembly comprises the liquid crystal layer and a transparent substrate (for example, a glass substrate or a plastic substrate) with different refractive rates. The refractive rate of the liquid crystal layer is configured to be larger than the refractive rate of the transparent substrate.

In some embodiments of the present disclosure, the transmission rate of the light is improved through optical waveguide display assembly. A portion of liquid crystal molecules are configured to be in a scattering state when an electric field is applied, thereby altering the size of the incidence angle of the light transmitted in the optical waveguide, which destroys the condition for total reflection between the liquid crystal and the substrate. Consequently, the light can emit out from corresponding locations to thereby realize the display function. As such, no polarizer is needed for achieving display function, and the transmission rate and utilization rate of the light can thereby be improved.

In specific embodiments of the present disclosure, the scattering power of the optical waveguide display assembly is configured according to the distance to the light source. Compared with a first portion of the optical waveguide display assembly that is closer to the light source, a second portion of the optical waveguide display assembly that is farther from to the light source is configured to have a larger scattering power (that is, the power to change the incidence angle of light to thereby destroy the conditions for total reflection). As such, the problem that the light transmitted in the optical waveguide display assembly is weaker in regions of the optical waveguide display assembly that are farther from the light source can be compensated for, thus improving the display uniformity of the display assembly.

Unless defined otherwise, the technical terms or scientific terms used in the present disclosure should be terms that can be understood by those skilled in the art. Words such as "first", "second" and so on do not indicate any order, amount or importance, those are only used to distinguish different portions. Words such as "comprise", "include" and so on mean the components or object before these words include the components or objects listed behind these words, and do not exclude other components or objects. Words such as "connect", "link" and so on are not limited to physical or mechanical connection, these also include electrical connection, no matter it is direct or indirection connection. Words such as "above", "over", "below", "left", "right" and so on are only used to represent relative locations, when the absolute locations of the object described are changed, the relative location relationship can be changed accordingly.

It should be understood, when components such as layer, film, region or substrate is referred for being "above" or "under" another component, the component can be located "directly" "above" or "under" another component, or there can be other components in between.

Embodiments of the present disclosure further provides an electronic device, comprising any one of the double-sided display device.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A display device comprising a first display assembly having a display surface and a back surface opposing to each other, the display assembly comprising:

a first pixel electrode substrate and a first common electrode substrate, oppositely aligned such that the first pixel electrode substrate and the common electrode substrate are respectively closer to the display surface and to the back surface of the first display assembly;

a first liquid crystal layer, sandwiched between, and configured to be in a scattering state responsive to an electric field being applied to, the pixel electrode substrate and the common electrode substrate;

a first light source disposed at a lateral side of the display assembly, configured to generate, and emit into the display assembly, a linearly polarized light having a first polarization direction; and a first blocking member, disposed at the side of the back surface and configured to block a light having the first polarization direction to, and to allow a light having a second polarization direction perpendicular to the first polarization direction to pass therethrough;

wherein:

the first display assembly is configured to have an altered scattering power according to a distance to the light source to thereby realize substantially uniform display therefor;

for any two regions of a same size and of a different distance to the light source, a first portion of the display assembly corresponding to a first region that is closer to the light source is configured to have a weaker scattering power than a second portion of the display assembly corresponding to a second region that is farther from the light source under a substantially same electrical signal such that the first region and the second region have a substantially same intensity of light scattered out of the display surface;

the liquid crystal layer comprises molecules of a macromolecule polymer and particles of a liquid crystal dispersed in the molecules of the macromolecule polymer, and the first portion of the display assembly comprises a lower concentration of the molecules of the macromolecule polymer than the second portion of the display assembly;

the display assembly further comprises a reflector, wherein the reflector is disposed on a side of the display assembly opposing to the light source and is configured to reflect light emitted from the light source and transmitting in the liquid crystal layer back into the liquid crystal layer to thereby improve a utilization rate of the light;

the display device further comprises:

a transparent substrate, disposed over the back surface and opposing to the display surface of the one display assembly;

a second display assembly having a display surface and a back surface opposing to each other and comprising:

a second pixel electrode substrate and a second common electrode substrate, oppositely aligned such that the pixel electrode substrate and the common electrode substrate are respectively closer to the display surface and to the back surface;

a second liquid crystal layer, sandwiched between, and configured to be in a scattering state responsive to an electric field being applied to, the pixel electrode substrate and the common electrode substrate;

a second light source disposed at a lateral side of the display assembly, configured to generate, and emit into the display assembly, a linearly polarized light having a first polarization direction;

a second blocking member, disposed at the side of the back surface and configured to block a light having the first polarization direction to, and to allow a light having a second polarization direction perpendicular to the first polarization direction to pass therethrough; and the first display assembly and the second display assembly are oppositely aligned to have the display surface thereof respectively facing outward.

2. The display assembly of claim 1, wherein the first blocking member comprises a first metal wire grid polarizer having a direction of transmission axis perpendicular to the first polarization direction.

3. The display assembly of claim 2, wherein the first metal wire grid polarizer is integrated in the first common electrode substrate.

4. The display assembly of claim 2, wherein the first metal wire grid polarizer comprises at least one of Al, Fe, or Cr.

5. The display assembly of claim 1, wherein the first liquid crystal layer comprises molecules of a macromolecule polymer and particles of a liquid crystal dispersed in the molecules of the macromolecule polymer, wherein the molecules of the macromolecule polymer and the particles of the liquid crystal are configured to have different refractive indices in a presence of, and to have a substantially same refractive index in an absence of, the electric field.

6. The display assembly of claim 1, wherein the first liquid crystal layer comprises molecules of a macromolecule polymer and particles of a liquid crystal dispersed in the molecules of the macromolecule polymer, and a first pixel electrode in the first region is configured to have a smaller area than a second pixel electrode in the second region.

7. The display device according to claim 1, further comprising a transparent substrate, disposed over the back surface and opposing to the display surface of the first display assembly.

8. The display device according to claim 1, wherein the first blocking member of the first display assembly and the second blocking member of the second display assembly are integrated into a shared blocking member.

9. The display device according to claim 8, wherein the first common electrode substrate of the first display assembly and the second common electrode substrate of the second display assembly are integrated into a shared common electrode substrate.

10. The display device according to claim 9, wherein the shared blocking member is integrated into the shared common electrode substrate.

11. The display device according to claim 10, wherein the shared blocking member comprises a second metal wire grid polarizer, comprising at least one Al, Fe, or Cr, and having a direction of the transmission axis perpendicular to the first polarization direction.

12. The display device according to claim 11, wherein the second metal wire grid polarizer comprises Cr and has a thickness of around 25 nm.

13. The display device according to claim 1, wherein the first display assembly and the second display assembly are configured to have an effective display area thereof respectively separated from one another.

14. The display device according to claim 13, wherein:

the common electrode substrate of the first display assembly and the common electrode substrate of the second display assembly are integrated into a shared common electrode substrate; and orthographic projection of each first pixel electrode in the pixel electrode substrate of the first display assembly over the shared common electrode substrate is not overlapped with orthographic projection of each second pixel electrode in the pixel electrode substrate of the second display assembly over the shared common electrode substrate.

\* \* \* \* \*